(12) United States Patent
Yu et al.

(10) Patent No.: US 12,517,607 B2
(45) Date of Patent: Jan. 6, 2026

(54) TOUCH DISPLAY PANEL

(71) Applicant: Wuhan China Star Optoelectronics Semiconductor Display Technology Co., Ltd., Hubei (CN)

(72) Inventors: Shengrong Yu, Hubei (CN); Liang Ma, Hubei (CN); Wenbo Li, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 203 days.

(21) Appl. No.: 17/637,825

(22) PCT Filed: Jan. 20, 2022

(86) PCT No.: PCT/CN2022/072954
§ 371 (c)(1),
(2) Date: Oct. 14, 2024

(87) PCT Pub. No.: WO2023/133917
PCT Pub. Date: Jul. 20, 2023

(65) Prior Publication Data
US 2025/0156006 A1    May 15, 2025

(30) Foreign Application Priority Data

Jan. 13, 2022    (CN) .......................... 202210034618.4

(51) Int. Cl.
*G06F 3/041*    (2006.01)
*G06F 3/044*    (2006.01)

(52) U.S. Cl.
CPC ........ *G06F 3/04164* (2019.05); *G06F 3/0412* (2013.01); *G06F 3/0446* (2019.05)

(58) Field of Classification Search
CPC ... G06F 3/04164; G06F 3/0446; G06F 3/0412
See application file for complete search history.

(56) References Cited

U.S. PATENT DOCUMENTS

| 2005/0116615 A1 | 6/2005 | Matsumoto et al. |
| 2017/0185196 A1* | 6/2017 | Kim ..................... G09G 3/3677 |
| 2024/0265860 A1* | 8/2024 | Sang .................... G09G 3/3216 |

FOREIGN PATENT DOCUMENTS

| CN | 105224131 | 1/2016 |
| CN | 206479736 | 9/2017 |

(Continued)

OTHER PUBLICATIONS

Zhang, CN 206479736 U machine translation, Sep. 8, 2017 (Year: 2017).*

(Continued)

*Primary Examiner* — Peter D McLoone

(57) ABSTRACT

The touch display panel provided by the present application includes a touch electrode wiring layer, which comprises a plurality of touch electrodes arranged in an array, and a signal transmission wiring layer, which is arranged on one side of the touch electrode wiring layer. The signal transmission wiring layer includes a plurality of touch electrodes. Each signal transmission line group is electrically connected to the plurality of touch electrodes in one-to-one correspondence. The signal transmission line group includes at least two signal transmission lines arranged at intervals, and the at least two signal transmission lines are electrically connected to the corresponding touch electrodes.

8 Claims, 7 Drawing Sheets

(56) References Cited

FOREIGN PATENT DOCUMENTS

| | | |
|---|---|---|
| CN | 107491213 | 12/2017 |
| CN | 107506076 | 12/2017 |
| CN | 108389869 | 8/2018 |
| CN | 108470751 | 8/2018 |
| CN | 108732832 | 11/2018 |
| CN | 108807466 | 11/2018 |
| CN | 110649179 | 1/2020 |
| CN | 111258141 | 6/2020 |
| CN | 111463255 | 7/2020 |
| CN | 111665998 | 9/2020 |
| CN | 113238402 | 8/2021 |
| CN | 113296640 | 8/2021 |
| CN | 113485586 | 10/2021 |
| CN | 113534999 | 10/2021 |
| JP | 2004-004725 | 1/2004 |

OTHER PUBLICATIONS

Fang, CN 113296640 A, Aug. 24, 2021 (Year: 2021).*
International Search Report and the Written Opinion Dated Oct. 10, 2022 From the International Searching Authority Re. Application No. PCT/CN2022/072964 and Its Translation Into English. (16 Pages).
Notification of Office Action and Search Report Dated Apr. 15, 2023 From The State Intellectual Property Office of the People's Republic of China Re. Application No. 202210034618.4 and Its Translation Into English. (19 Pages).

* cited by examiner

TOUCH DISPLAY PANEL

This application is a National Phase of PCT Patent Application No. PCT/CN2022/072954 having International Filing Date of Jan. 20, 2022, which claims the benefit of priority of Chinese Patent Application No. 202210034618.4 filed on Jan. 13, 2022. The contents of the above applications are all incorporated by reference as if fully set forth herein in their entirety.

FIELD OF INVENTION

The present application relates to a display technology field, and particularly to a touch display panel.

FIELD AND BACKGROUND OF THE INVENTION 1

Touch technology has developed rapidly in recent years, and a variety of touch display panels have been put into mass production. A design structure of an existing touch display panel is to provide a touch electrode wiring layer and a signal transmission wiring layer. The touch electrode wiring layer comprises a'plurality of touch electrodes, and the signal transmission wiring layer comprises at least two signal transmission lines. The plurality of touch electrodes are electrically connected to the at least two signal transmission lines in a one-to-one correspondence. The existing touch display panel uses a signal transmission wiring layer to transmit touch signals.

However, as a size of the touch display panel becomes larger, a length of the signal transmission line becomes longer, so that resistive-capacitive loads on the signal transmission line becomes larger and results in dropping of a control accuracy.

SUMMARY OF THE INVENTION

Technical Issue

The present application provides a touch display panel, which can reduce resistive-capacitive loads on a signal transmission line, thereby improving touch precision of the touch display panel.

Solution for Issue

Technical Solution

The present application provides a touch display panel, comprising a touch electrode wiring layer, wherein the touch electrode wiring layer comprises a plurality of touch electrodes, and the plurality of touch electrodes are arranged in an array; and
  a signal transmission wiring layer, wherein the signal transmission wiring layer is arranged on one side of the touch electrode wiring layer, the signal transmission wiring layer comprises a plurality of signal transmission line groups, and the plurality of signal transmission line groups and the plurality of touch electrodes are electrically connected in one-to-one correspondence;
  wherein each group of the plurality of signal transmission line groups comprises at least two of the signal transmission lines, the at least two of the signal transmission lines are arranged at intervals, and the at least two of the signal transmission lines in each group of the signal transmission line groups are electrically connected with the corresponding touch electrodes.

In the touch display panel of the present application, the signal transmission line group further comprises a first connection line, the first connection line is disposed between the adjacent signal transmission lines, and the first connection line overlaps the plurality of the touch electrodes.

In the touch display panel of the present application, the signal transmission line group further comprises a second connection line, the second connection line is disposed between the adjacent signal transmission lines, and an orthographic projection of the second connection line on the touch electrode wiring layer is located between the adjacent touch electrodes.

In the touch display panel of the present application, the signal transmission line group further comprises a third connection line, and the third connection line is arranged at a shortest distance between the adjacent signal transmission lines.

In the touch display panel of the present application, the signal transmission line group further comprises a third connection line, and the third connection line is arranged at a shortest distance between the adjacent signal transmission lines.

In the touch display panel of the present application, the touch display panel comprises a light emitting layer, and the light emitting layer is disposed on one side of the touch electrode wiring layer,
  the light emitting layer comprises a plurality of first sub-pixels displaying a first color, a plurality of second sub-pixels displaying a second color, and a plurality of third sub-pixels displaying a third color;
  the first sub-pixel and the second sub-pixel are arranged in a first row along a first direction, the third sub-pixel is arranged in a second row along the first direction, and the first row and the second row are spaced apart in a second direction, and the first direction is different from the second direction;
  the plurality of the touch electrodes are arranged in a plurality of columns along the second direction, and each group of the plurality of signal transmission line groups is arranged along the second direction and overlaps at least one of the touch electrodes in the same column; and
  the signal transmission lines in the plurality of the signal transmission line groups overlap gaps between the adjacent first sub-pixels and the second sub-pixels, and overlap gaps between the adjacent third sub-pixels.

In the touch display panel of the present application, there is a first gap and a second gap between the adjacent third sub-pixels in the second row, and the first gap is larger than the second gap;
  there is a third gap between the adjacent first sub-pixels and the second sub-pixels in the first row, and the first gap is larger than the third gap; and
  the adjacent signal transmission lines are separated by at least one of the second gaps or one of the third gaps in the same signal transmission line group.

In the touch display panel of the present application, in the same signal transmission line group, a pair of the adjacent first sub-pixels and second sub-pixels or a pair of the adjacent third sub-pixels are spaced apart between the adjacent signal transmission lines.

In the touch display panel of the present application, in the same signal transmission line group, the adjacent signal transmission lines are further arranged to overlap the same first gap.

In the touch display panel of the present application, the signal transmission line group further comprises a third connection line disposed at the shortest distance between adjacent signal transmission lines, and the third connection line is arranged to overlap the first gap.

In the touch display panel of the present application, a length of the third sub-pixel is greater than a length of the first sub-pixel, and/or the length of the third sub-pixel is greater than a length of the first sub-pixel The length of two sub-pixels.

The present application further provides a touch display panel, comprising a touch electrode wiring layer, wherein the touch electrode wiring layer comprises a plurality of touch electrodes, and the plurality of touch electrodes are arranged in an array; and a signal transmission wiring layer, wherein the signal transmission wiring layer is arranged on one side of the touch electrode wiring layer, the signal transmission wiring layer comprises a plurality of signal transmission line groups, and the plurality of signal transmission line groups and the plurality of touch electrodes are electrically connected in one-to-one correspondence;

wherein each group of the plurality of signal transmission line groups comprises at least two of the signal transmission lines, the at least two of the signal transmission lines are arranged at intervals, and the at least two of the signal transmission lines in each group of the signal transmission line groups are electrically connected with the corresponding touch electrodes;

wherein the signal transmission line group further comprises a first connection line, the first connection line is disposed between the adjacent signal transmission lines, and the first connection line overlaps the plurality of the touch electrodes; and wherein the signal transmission line group further comprises a second connection line, the second connection line is disposed between the adjacent signal transmission lines, and an orthographic projection of the second connection line on the touch electrode wiring layer is located between the adjacent touch electrodes.

In the touch display panel of the present application, the signal transmission line group further comprises a third connection line, and the third connection line is arranged at a shortest distance between the adjacent signal transmission lines.

In the touch display panel of the present application, the signal transmission line group further comprises a third connection line, and the third connection line is arranged at a shortest distance between the adjacent signal transmission lines.

In the touch display panel of the present application, the touch display panel comprises a light emitting layer, and the light emitting layer is disposed on one side of the touch electrode wiring layer, the light emitting layer comprises a plurality of first sub-pixels displaying a first color, a plurality of second sub-pixels displaying a second color, and a plurality of third sub-pixels displaying a third color;

the first sub-pixel and the second sub-pixel are arranged in a first row along a first, direction, the third sub-pixel is arranged in a second row along the first direction, and the first row and the second row are spaced apart in a second direction, and the first direction is different from the second direction;

the plurality of the touch electrodes are arranged in a plurality of columns along the second direction, and each group of the plurality of signal transmission line groups is arranged along the second direction and overlaps at least one of the touch electrodes in the same column; and the signal transmission lines in the plurality of the signal transmission line groups overlap gaps between the adjacent first sub-pixels and the second sub-pixels, and overlap gaps between the adjacent third sub-pixels.

In the touch display panel of the present application, there is a first gap and a second gap between the adjacent third sub-pixels in the second row, and the first gap is larger than the second gap;

there is a third gap between the adjacent first sub-pixels and the second sub-pixels in the first row, and the first gap is larger than the third gap; and the adjacent signal transmission lines are separated by at least one of the second gaps or one of the third gaps in the same signal transmission line group.

In the touch display panel of the present application, in the same signal transmission line group, a pair of the adjacent first sub-pixels and second sub-pixels or a pair of the adjacent third sub-pixels are spaced apart between the adjacent signal transmission lines.

In the touch display panel of the present application, in the same signal transmission line group, adjacent signal transmission lines are further arranged to overlap with the same first gap.

In the touch display panel of the present application, the signal transmission line group further comprises a third connection line disposed at the shortest distance between adjacent signal transmission lines, and the third connection line is arranged to overlap the first gap.

In the touch display panel of the present application, a length of the third sub-pixel is greater than a length of the first sub-pixel, and/or the length of the third sub-pixel is greater than a length of the first sub-pixel The length of two sub-pixels.

Beneficial Effect of Invention

Beneficial Effect

In the touch display panel provided by the present application, by electrically connecting one touch electrode with at least two signal transmission lines, and the at least two signal transmission lines are arranged in parallel, a total resistance of the at least two signal transmission lines electrically connected with the touch electrode can be reduced, so that a resistive-capacitive load on the signal transmission lines can be reduced, and touch precisions of the touch display panel can be improved.

BRIEF DESCRIPTION OF THE SEVERAL VIEWS OF THE DRAWINGS

Description of Drawings

In order to more clearly illustrate technical solutions in embodiments of the present disclosure, a brief description of accompanying drawings used in a description of the embodiments will be given below. Obviously, the accompanying drawings in the following description are merely some embodiments of the present disclosure. For those skilled in the art, other drawings may be obtained from these accompanying drawings without creative labor.

Figure 1:
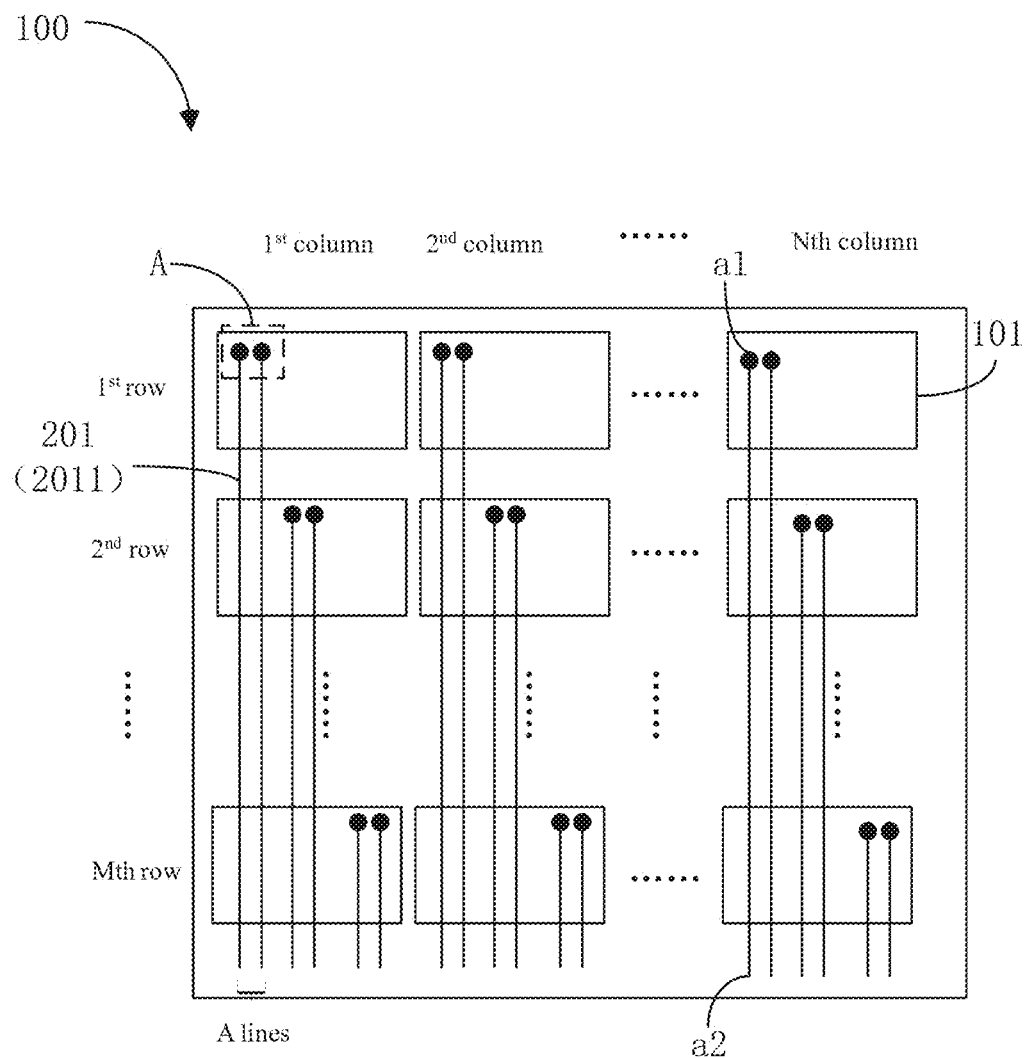

FIG. 1 is a first structural schematic diagram of a touch display panel provided by an embodiment of the present application.

Figure 2:
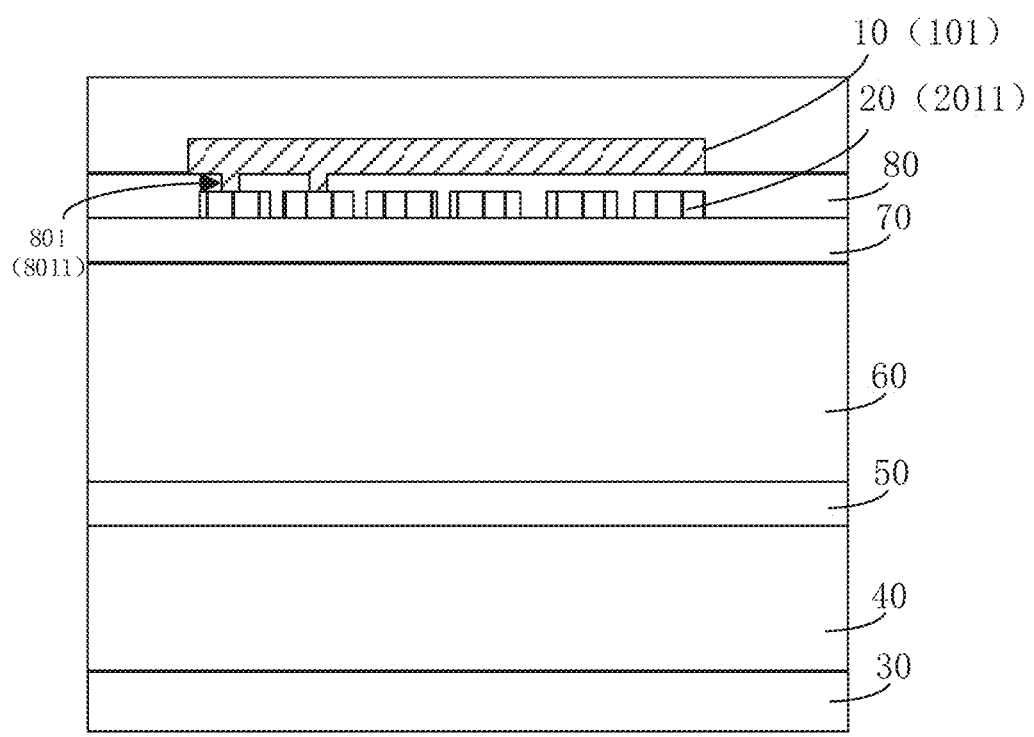

FIG. 2 is a cross-sectional view of a region A of the touch display panel shown in FIG. 1.

Figure 3:
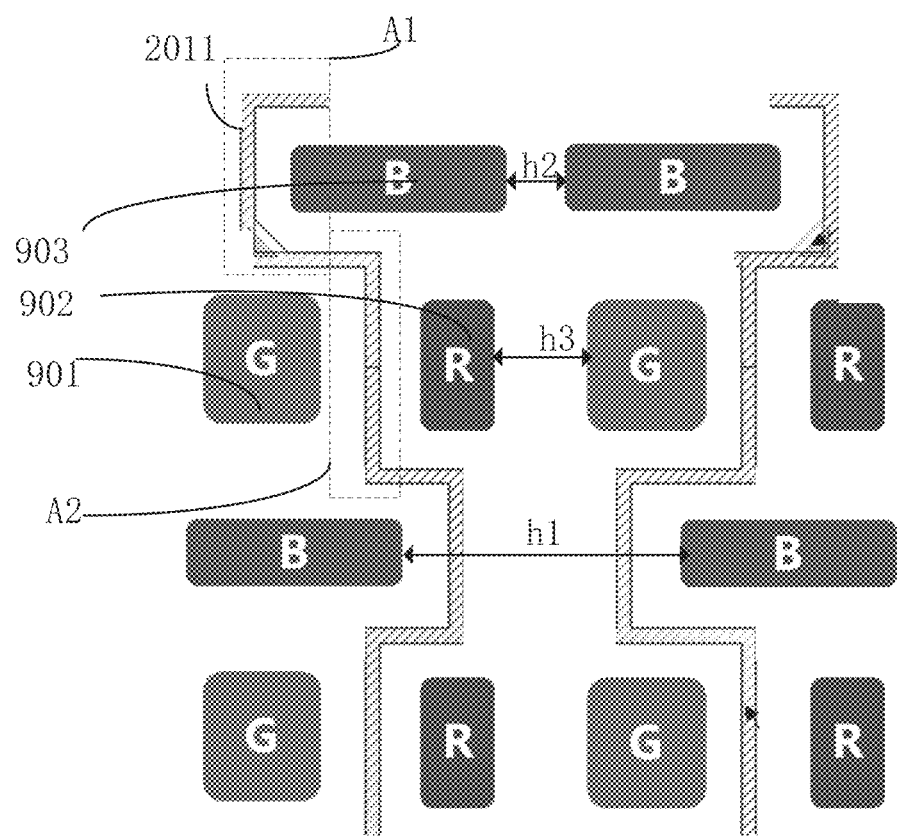

FIG. 3 is an enlarged schematic view of the region A of the touch display panel shown in FIG. 1.

Figure 4:
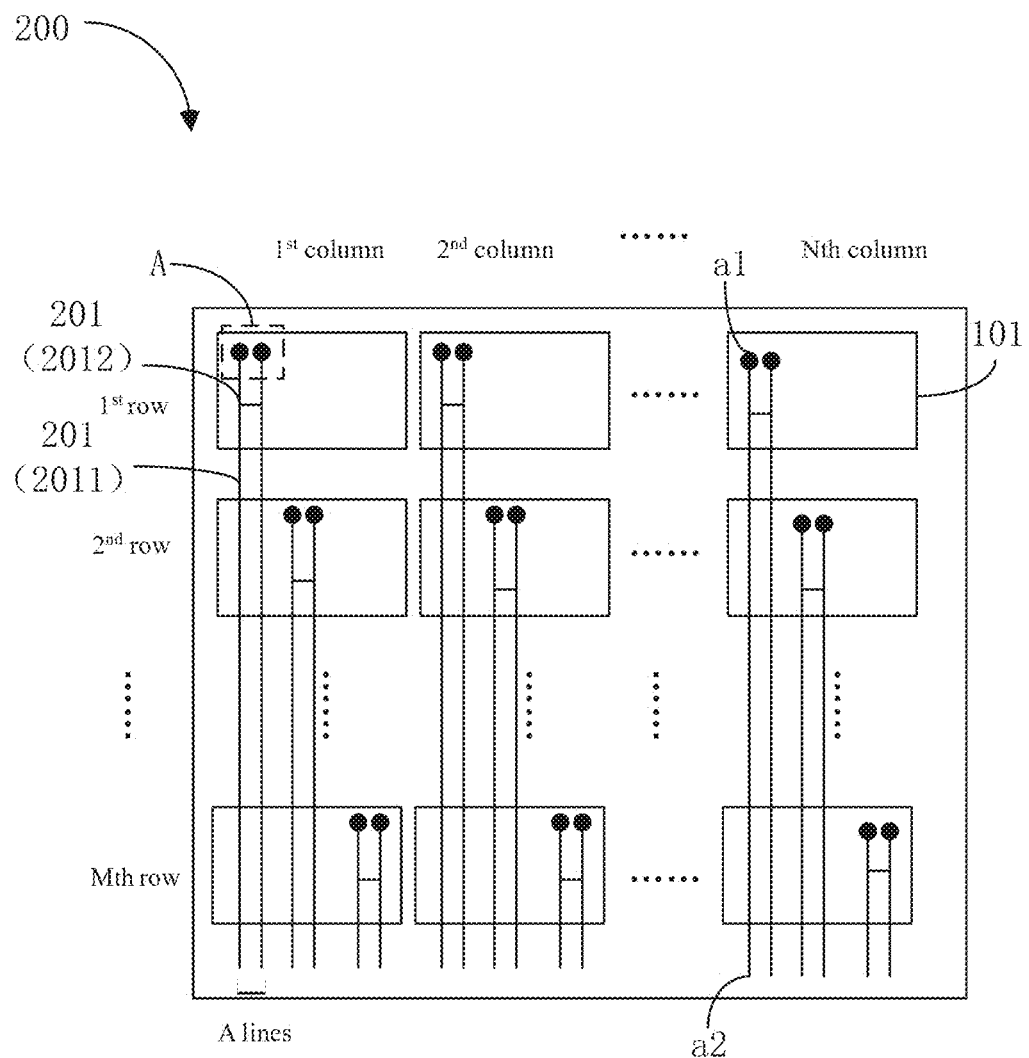

FIG. 4 is a second structural schematic diagram of a touch display panel provided by an embodiment of the present application.

Figure 5:
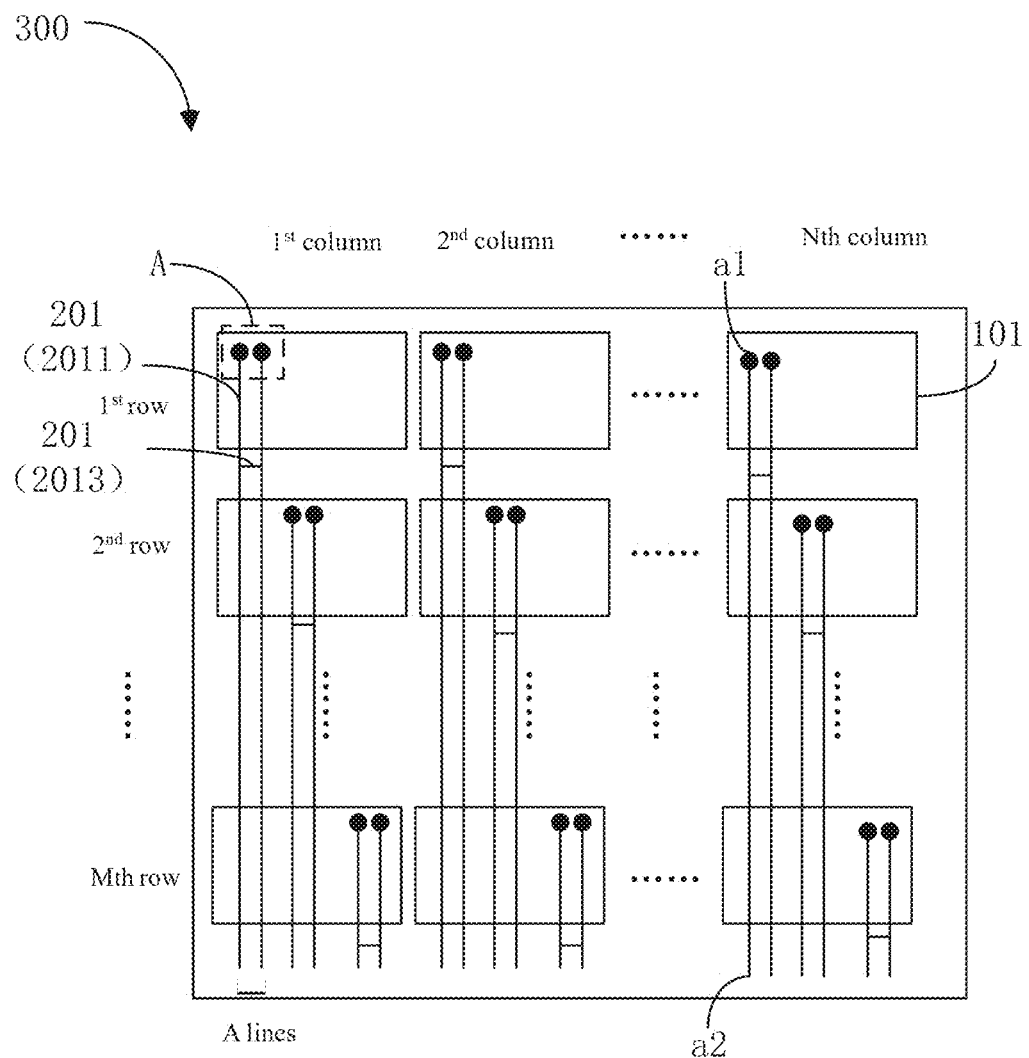

FIG. 5 is a third structural schematic diagram of a touch display panel provided by an embodiment of the present application.

Figure 6:
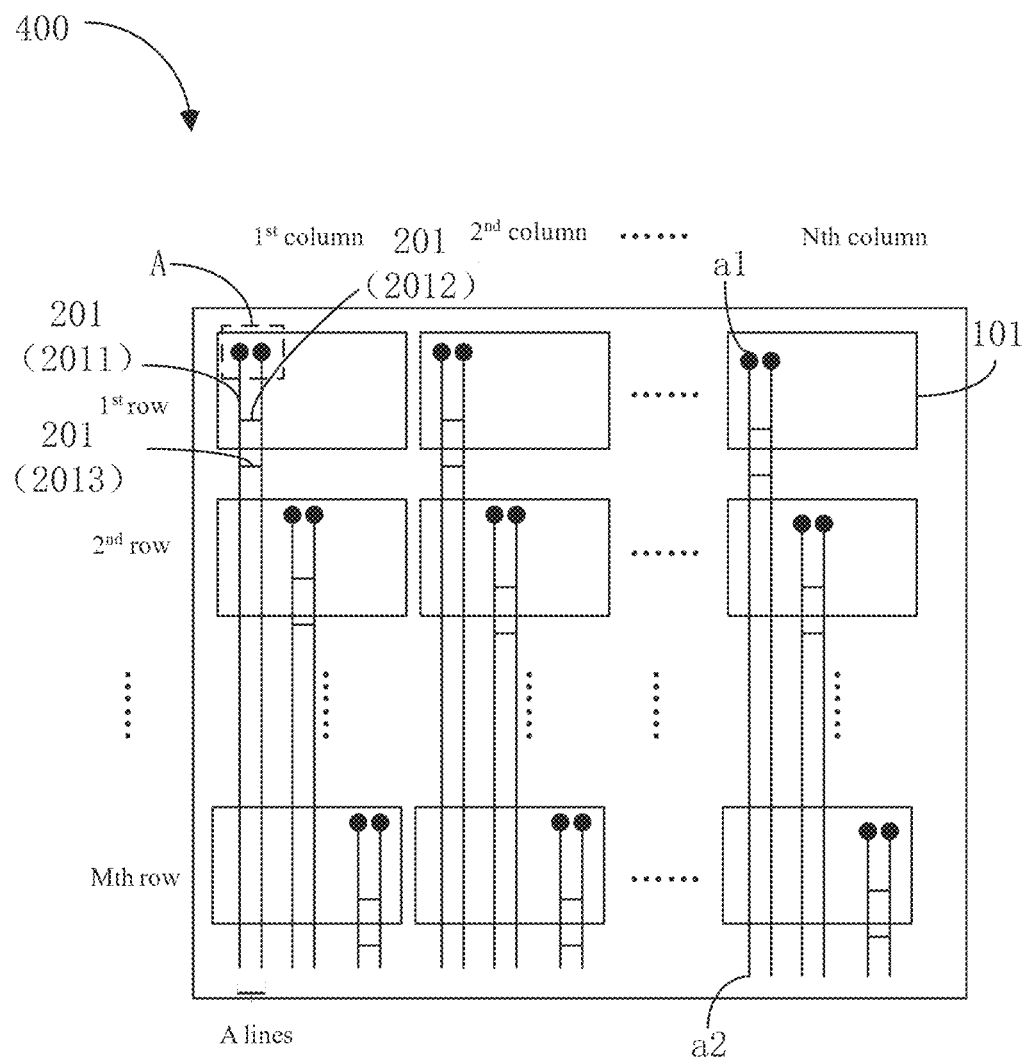

FIG. 6 is a fourth structural schematic diagram of a touch display panel provided by an embodiment of the present application.

Figure 7:
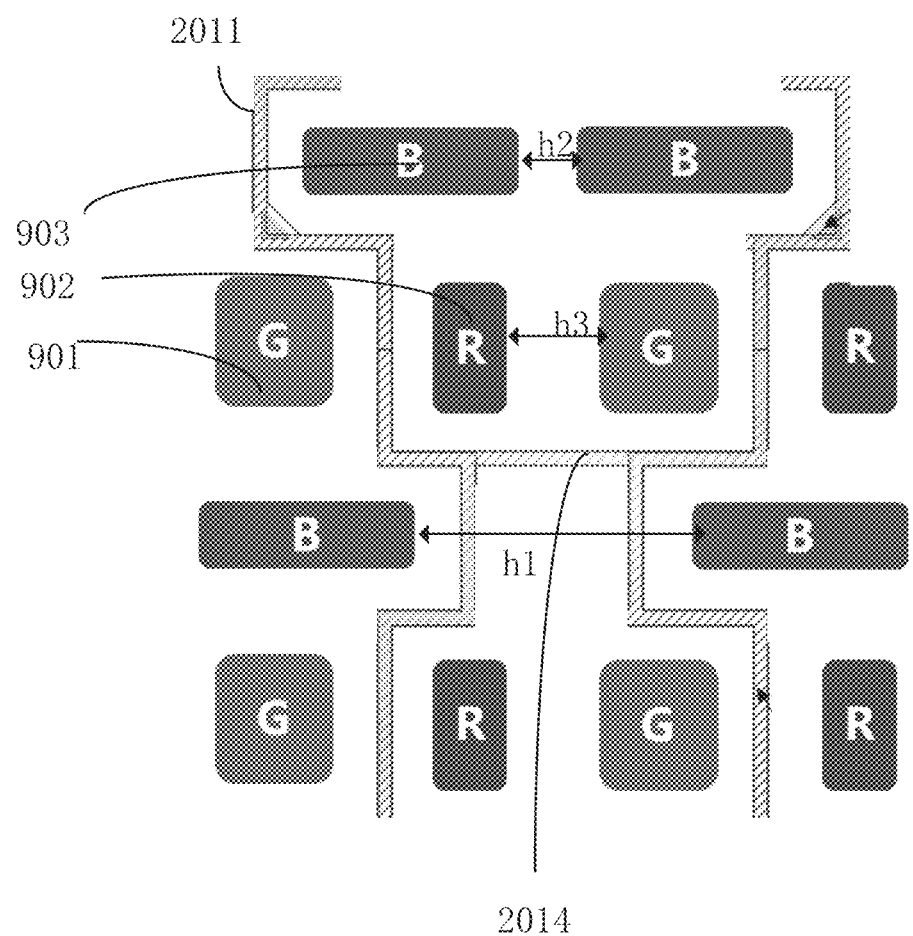

FIG. 7 is an enlarged schematic view of a region B of the touch display panel shown in FIG. 4, FIG. 5 or FIG. 6.

DETAILED DESCRIPTION OF SPECIFIC EMBODIMENTS OF THE INVENTION

Detailed Description of Embodiments

Technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in this application, all other embodiments obtained by those skilled in the art without creative efforts shall fall within the protection scope of this application.

In addition, the terms "first", "second" and the like in the description and claims of the present application are used to distinguish different objects, rather than to describe a specific order. The terms "comprising" and "having", and any variations thereof, are intended to cover non-exclusive inclusion.

Please refer to FIG. 1 and FIG. 2, FIG. 1 is a first structural schematic diagram of a touch display panel provided by an embodiment of the present application, and FIG. 2 is a cross-sectional view of in region A the touch display panel shown in FIG. 1. With reference to FIG. 1 and FIG. 2, the touch display panel 100 provided by the embodiment of the present application comprises a touch electrode wiring layer 10 and a signal transmission wiring layer 20. The touch electrode wiring layer 10 comprises a plurality of touch electrodes 101. The plurality of touch electrodes 101 are arranged in an array. The signal transmission wiring layer 20 comprises a plurality of signal transmission line groups 201. The plurality of signal transmission line groups 201 are electrically connected to the plurality of touch electrodes 101 in one-to-one correspondence. Each signal transmission line group 201 comprises at least two signal transmission lines 2011. The at least two signal transmission lines 2011 are arranged at intervals. The at least two signal transmission lines 2011 in each signal transmission line group 201 are electrically connected to the corresponding touch electrodes 101.

In this embodiment of the present application, by electrically connecting one touch electrode 101 to at least two signal transmission lines 2011, the at least two signal transmission lines 2011 can be arranged in parallel, and a total resistance of the at least two signal transmission lines 2011 electrically connected to the touch electrode 101 can be reduced, so that a resistive-capacitive load on the signal transmission line 2011 can be reduced, and a touch precision of the touch display panel 100 can be improved.

Specifically, one touch electrode 101 is taken as an example for description. One touch electrode 101 corresponds to one signal transmission line group 201, and one touch electrode 101 is electrically connected to one signal transmission line group 201. A signal transmission line group 201 comprises at least two signal transmission lines 2011, and the at least two signal transmission lines 2011 are both electrically connected to the touch electrodes 101. Compared with the prior art, one touch electrode is only electrically connected to one signal transmission line. As a size of the touch display panel becomes larger, a length of the signal transmission line becomes longer, so that a resistive-capacitive load on the signal transmission line becomes larger. The load will affect an accuracy of the touch signal transmitted by the signal transmission line, resulting in decreased touch precision. The embodiment of the present application can reduce the resistive-capacitive load on the signal transmission line 2011, thereby improving a touch precision of the touch display panel 100.

Herein, the signal transmission line 2011 has a first end a1 and a second end a2 disposed opposite to each other. The first end a1 is electrically connected to the touch electrode 101, and the second end a2 is electrically connected to a touch sensing chip (not shown in the figure). The signal transmission line 2011 extends along a direction from the first end a1 to the second end a2. It should be noted that, in a signal transmission line group 201, the first end a1 of each signal transmission line 2011 is electrically connected to the touch electrode 101, and the second end a2 of each signal transmission line 2011 is electrically connected to the touch sensing chip.

For a signal transmission line 2011, as a size of the touch display panel 100 increases, a length from the first end a1 to the second end a2 of the signal transmission line 2011 become longer, so that a resistive-capacitive load on the signal transmission line 2011 increases. For at least two signal transmission lines 2011 in a signal transmission line group 201, in this embodiment of the present application, one touch electrode 101 is correspondingly electrically connected to at least two signal transmission lines 2011, and the at least two signal transmission lines 2011 are arranged in parallel. This can reduce a total resistance of the at least two signal transmission lines 2011 electrically connected to the touch electrodes 101, reduce the resistive-capacitive load on the signal transmission lines 2011, and improve a touch precision of the touch display panel 100.

It can be understood that, in this embodiment of the present application, the signal transmission lines 2011 extend along a column direction. In the extending direction of the signal transmission lines 2011, each signal transmission line 2011 is electrically connected to one touch electrode 101 and is insulated from the rest of the touch electrodes 101. It should be noted that a column direction refers to an extension direction parallel to the data signal lines, and a row direction refers to an extension direction parallel to the scan signal lines.

Specifically, the touch electrode wiring layer 10 comprises M rows of touch electrodes 101 arranged along the column direction and N columns of touch electrodes 101 arranged along the row direction. The signal transmission wiring layer 20 comprises M*N*A signal transmission lines 2011 extending along the column direction. Herein, M represents the number of columns of the touch electrodes 101, N represents the number of rows of the touch electrodes 101, and A represents the number of signal transmission lines 2011 in a signal transmission line group 201. Each column of touch electrodes 101 has M*A signal transmission lines 2011. Herein, in the touch electrodes 101 in the first column, the A lines of the signal transmission lines 2011 in the first group of the signal transmission line groups 201 correspond to the touch electrodes 101 in the first row, and the A lines of the signal transmission lines 2011 in the first group of the signal transmission line groups 201 are electrically connected to the touch electrode 101 in the first row and insulated from the rest of the touch electrodes 101. In the touch electrodes 101 in the first column, the A lines of the signal transmission lines 2011 in the second group of the signal transmission line groups 201 correspond to the touch electrode 101 in the second row, and the A lines of the signal transmission lines 2011 in the second group of signal transmission line groups 201 correspond to the touch electrode 101 in the second row are electrically connected and insulated from the other touch electrodes 101. In this way, in the touch electrodes 101 in the first column, the A lines of the signal transmission lines 2011 in the MTh signal transmission line group 201 correspond to the MTh row of the touch electrodes 101, and the signal transmission line 2011 in the MTh row are electrically connected to the touch electrode 101 and are insulated from the rest of the touch electrodes 101.

It can be understood that, among the M*A signal transmission lines 2011 of the touch electrodes 101 in the same column, the A lines of the signal transmission lines 2011 are electrically connected to the touch electrodes 101 in one row, so that touch signals corresponding to the touch electrodes 101 in each row are drawn out respectively.

As shown in FIG. 1 and FIG. 2, the touch display panel 100 comprises a substrate 30, an array layer 40, a light emitting layer 50, an encapsulation layer 60, a second insulating layer 70, a signal transmission wiring layer 20, a first insulating layer, and a touch electrode wiring layer 10. The substrate 30, the array layer 40, the light emitting layer 50, the encapsulation layer 60, the second insulating layer 70, the signal transmission wiring layer 20, the first insulating layer 80 and the touch electrode wiring layer 10 are stacked in sequence. That is, the signal transmission wiring layer 20, the first insulating layer 80 and the touch electrode wiring layer 10 are sequentially stacked and disposed on one side of the second insulating layer 70 away from the substrate 30.

Herein, the substrate 30 may be a flexible substrate. The substrate 30 may also be a rigid substrate. A material of the flexible substrate may be polyimide, and a material of the rigid substrate may be glass.

The array layer 40 may comprise pixel driving circuits. The pixel drive circuits may comprise several transistors and storage capacitors. For example, a pixel driving circuit with a 2T1C structure may comprise a switching transistor, a driving transistor, and a storage capacitor.

The light emitting layer 50 may comprise a first electrode layer, a pixel definition layer, a light-emitting material layer, and a second electrode layer that are sequentially stacked on the array layer. The first electrode layer comprises several first electrodes. The pixel definition layer has openings exposing the first electrodes. The light-emitting material layer comprises a plurality of light-emitting blocks, and the light-emitting blocks are arranged in the openings. The second electrode layer comprises a second electrode, and the second electrode is disposed on the light-emitting block and the pixel definition layer. The first electrode, the light-emitting blocks and the second electrode form a plurality of sub-pixels. The plurality of sub-pixels are arranged in an array.

The light-emitting blocks may be red light-emitting blocks, green light-emitting blocks or blue light-emitting blocks. The light-emitting blocks can also be red light-emitting blocks, green light-emitting blocks, blue light-emitting blocks or white light-emitting blocks. The sub-pixels of the three primary colors of red, green and blue or the four primary colors of red, green, blue and white are alternately distributed. A material of the light-emitting block may be an organic light-emitting material.

The first electrode may be an anode. A material of the first electrode may be a light-transmitting material or a light-reflecting material. The light-transmitting material may be at least one of indium tin oxide (ITO), indium zinc oxide (IZO), and indium gallium zinc oxide (IGZO). The reflective material may comprise silver (Ag) and its alloys, aluminum (Al) and its alloys, such as silver (Ag), alloys of silver and lead (Ag:Pb), alloys of aluminum and neodymium (Al:Nd), silver Alloys of platinum and copper (Ag:Pt:Cu), etc.

The second electrode may be a cathode. A material of the second electrode may be a partial light reflecting material (semi-transparent and semi-reflective material) or a light-reflecting material with functions of partial light transmission. The semi-transparent and semi-reflective material may comprise: at least one of magnesium, silver, and aluminum, for example, a mixture of magnesium and silver or a mixture of aluminum and silver. The light-transmitting material may be at least one of indium tin oxide (ITO), indium zinc oxide (IZO), and indium gallium zinc oxide (IGZO).

In some embodiments, a light-emitting manner of the sub-pixels may be an active-matrix (AM) method. The active-matrix driving light-emitting mode is also called the active driving mode, and the light-emitting of the sub-pixels is controlled by the pixel driving circuits. A gate of the switching transistor is electrically connected to a scan signal line. When the scanning signal is an on voltage, the switching transistor keeps the data signal on a data signal line on a plate of the storage capacitor, and when the scanning signal is an off voltage, the data signal kept on the storage capacitor keeps the driving transistor turned on, so that a power signal on a power supply signal line continuously supplies power to the first electrode of the sub-pixels.

Herein, the encapsulation layer 60 may be a TFE film. The encapsulation layer may comprise an alternatively overlapped structure of several organic encapsulation layers and inorganic encapsulation layers.

Here, the signal transmission wiring layer 20 comprises a plurality of signal transmission line groups 201. The signal transmission line group 201 comprises at least two signal transmission lines 2011. A material of the signal transmission wiring layer 20 may be an opaque material, such as metal. The material of the signal transmission wiring layer 20 may also be a light-transmitting material, such as at least one of indium tin oxide (ITO), indium zinc oxide (IZO), and indium gallium zinc oxide (IGZO).

Herein, the touch electrode wiring layer 10 comprises a plurality of touch electrodes 101. The plurality of touch electrodes 101 are arranged in an array. The plurality of touch electrodes 101 are electrically connected to the plurality of signal transmission line groups 201 in one-to-one correspondence. A material of the touch electrode wiring layer 10 may be an opaque material, such as metal. The material of the touch electrode wiring layer 10 may also be a transparent material, such as at least one of indium tin oxide (ITO), indium zinc oxide (IZO), and indium gallium zinc oxide (IGZO).

It should be noted that the signal transmission wiring layer 20 is provided on one side of the touch electrode wiring layer 10. In the embodiment of the present application, the signal transmission wiring 20 is arranged on the substrate 30, and the touch electrode wiring layer 10 is arranged on a side of the signal transmission wiring layer 20 away from the substrate 30. That is, the touch electrode wiring layer 10 is away from the substrate 30, and the signal transmission wiring layer 20 is close to the substrate 30. In some embodiments, the touch electrode wiring layer 10 is provided on the substrate 30, and the signal transmission wiring layer 20 is provided on a side of the touch electrode wiring layer 10 away from the substrate 30. That is, the touch electrode wiring layer 10 is close to the substrate 30, and the signal transmission wiring layer 20 is away from the substrate 30.

Herein, the first insulating layer 80 is disposed between the signal transmission wiring layer 20 and the touch electrode wiring layer 10. In this embodiment of the present application, the signal transmission wiring layer 20 is insulated from the touch electrode wiring layer 10 by the first insulating layer 80. The touch electrode 101 is electrically connected to the signal transmission line group 201 on the signal transmission wiring layer 20.

Specifically, the first insulating layer 80 is provided with a plurality of via groups 801, and the plurality of via groups 801 are in one-to-one correspondence with the plurality of signal transmission line groups 201. The via hole group 801 comprises a plurality of via holes 8011, and the plurality of via holes 8011 are in one-to-one correspondence with at least two signal transmission lines 2011. The signal transmission lines 2011 are electrically connected to the corresponding touch electrodes 101 through the corresponding via holes 8011. For example, take a touch electrode 101 as an example for illustration, one touch electrode corresponds to one signal transmission line group 201, and one signal transmission line group 201 corresponds to one via hole group 801. A signal transmission line group 201 comprises at least two signal transmission lines 2011, a via hole group 801 comprises a plurality of via holes 8011, and the at least two signal transmission lines 2011 are electrically connected to the corresponding touch electrodes 101 through the plurality of via holes 8011. It should be noted that, in some embodiments, the number of via holes on the first insulating layer 80 may be set according to actual needs, which is not limited herein.

Further, please refer to FIG. 3, which is an enlarged schematic view of a region A of the touch display panel shown in FIG. 1. With reference to FIG. 1, FIG. 2, and FIG. 3, the touch display panel 100 provided by the embodiment of the present application comprises a light-emitting layer 50. The light emitting layer 50 is disposed on one side of the touch electrode wiring layer 10.

The light-emitting layer 50 comprises a plurality of first sub-pixels 901 displaying a first color, a plurality of second sub-pixels 902 displaying a second color, and a plurality of third sub-pixels 903 displaying a third color.

Herein, the first sub-pixel 901 and the second sub-pixel 902 are arranged in the first row at intervals along the first direction, the third sub-pixel 903 is arranged in the second row along the first direction, and the first row and the second row are arranged at intervals in the first row, and the first direction is different from the second direction. It should be noted that the arrangement of the sub-pixels in the touch display panel shown in FIG. 3 is only an embodiment of the present application, and the sub-pixels in the touch display panel provided by the present application also adopt other pixel arrangements. The distribution method is not limited here.

Herein, a length of the third sub-pixel 903 is greater than a length of the first sub-pixel 901, and/or a length of the third sub-pixel 903 is greater than the length of the second sub-pixel 902.

In one embodiment, the first sub-pixel 901 is a green subpixel, the second sub-pixel 902 is a red subpixel, and the third sub-pixel 903 is a blue subpixel.

The signal transmission line 2011 is in the shape of a broken line. The signal transmission line 2011 is arranged along the edges of the sub-first sub-pixel 901, the second sub-pixel 902 and the third sub-pixel 903. It can be understood that, on a path extending from the first end a1 to the second end a2 of the signal transmission line 2011, the signal transmission line 2011 extends away from the first sub-pixel 901, the second sub-pixel 902 and the third sub-pixel 903. The touch electrodes 101 comprise a plurality of electrically connected touch wires, and the signal transmission wires partially overlap with the touch electrodes.

Specifically, the signal transmission line comprises a first part A1 and a second part A2 that are connected to each other. The first part A1 is disposed at the edge of the first sub-pixel 901, and the second part A2 is disposed between the adjacent second sub-pixels 902 and the third sub-pixels 903. The first part A1 is U-shaped and the second part A2 is straight.

Herein, the plurality of touch electrodes 101 are arranged in multiple rows along the second direction, and each signal transmission line group 201 is arranged along the second direction and overlaps with at least one touch electrode 101 in the same row. The signal transmission line 2011 in the signal transmission line group 201 overlaps with the gap between the adjacent first sub-pixels 901 and the second sub-pixels 902, and overlaps with the gap between the adjacent third sub-pixels 903.

Herein, in the second row, there is a first gap h1 or a second gap h2 between adjacent third sub-pixels 903, and the first gap h1 is larger than the second gap h2. There is a third gap h3 between adjacent first sub-pixels 901 and second sub-pixels 902 in the first row, and the first gap h1 is larger than the third gap h3. In the same signal transmission line group 201, adjacent signal transmission lines 2011 are separated by at least one second gap h2 or one third gap h3.

Herein, in the same signal transmission line group 201, the adjacent signal transmission lines 2011 are separated by a pair of adjacent first sub-pixels 901 and second sub-pixels 902, or by a pair of adjacent third sub-pixels 903.

Herein, in the same signal transmission line group 201, the adjacent signal transmission lines 2011 are also arranged to overlap with the same first gap h1.

In the touch display panel provided by the embodiment of the present application, by electrically connecting one touch electrode 101 to at least two signal transmission lines 2011, and at least two signal transmission lines 2011 are arranged in parallel, and the total resistance of the at least two signal transmission lines 2011 electrically connected to the touch electrode 101 can be reduced, so that the resistive-capacitive load on the signal transmission lines 2011 can be reduced, and a touch precision of the touch display panel 100 can be improved.

Please refer to FIG. 4. FIG. 4 is a second structural schematic diagram of the touch display panel provided by the embodiment of the present application. The difference between the touch display panel 200 shown in FIG. 4 and the touch display panel 100 shown in FIG. 1 is that in the touch display panel 200 shown in FIG. 4, the signal transmission line group 201 further comprises a first connecting line 2012. The first connection line 2012 is disposed between adjacent signal transmission lines 2011, and the first connection line 2012 overlaps the touch electrodes 101.

In the touch display panel 200 provided by the embodiment of the present application, by electrically connecting one touch electrode 101 to at least two signal transmission lines 2011, and at least two signal transmission lines 2011 are arranged in parallel, it is possible to reduce a total resistance of the two signal transmission lines 2011 electrically connected to the touch electrode, so that can reduce the resistive-capacitive load on the signal transmission lines 2011 and improve the touch precision of the touch display panel 200. At the same time, the embodiment of the present application also sets the first connection line 2012 in the signal transmission line group 201. By electrically connecting adjacent signal transmission lines 2011 through the first connection lines 2012, an electrical conductivity of the signal transmission line group 201 can be further improved.

Please refer to FIG. 5, FIG. 5 is a third structural schematic diagram of a touch display panel provided by an embodiment of the present application. The difference between the touch display panel 300 shown in FIG. 5 and the touch display panel 100 shown in FIG. 1 is that in the touch display panel 300 shown in FIG. 5, the signal transmission line group 201 further comprises a second connection line 2013. The second connection lines 2013 are disposed between adjacent signal transmission lines 2011, and an orthographic projection of the second connection lines 2013 on the touch electrode wiring layer is located between adjacent touch electrodes 101.

In the touch display panel 300 provided by the embodiments of the present application, by electrically connecting one touch electrode 101 to at least two signal transmission lines 2011, and the at least two signal transmission lines 2011 are arranged in parallel, the total resistance of the at least two signal transmission lines 2011 electrically connected to the touch electrode 101 can be reduced, thereby reducing the resistive-capacitive load on the signal transmission lines 2011 and improve the touch precision of the touch display panel 300. At the same time, the application embodiment also provides a second connection line 2013 in the signal transmission line group 201, by electrically connecting the adjacent signal transmission lines 2011 through the second connection lines 2013, the electrical conductivity of the signal transmission line group 201 can be further improved.

Please refer to FIG. 6, FIG. 6 is a fourth structural schematic diagram of the touch display panel provided by the embodiment of the present application. The difference between the touch display panel 400 shown in FIG. 6 and the touch display panel 100 shown in FIG. 1 is that in the touch display panel 400 shown in FIG. 6, the signal transmission line group 201 further comprises a first connection line 2012 and the second connection line 2013. The first connection lines 2012 are disposed between adjacent signal transmission lines 2011, and the first connection lines 2012 are disposed overlapping the touch electrodes 101. The second connection lines 2013 are disposed between adjacent signal transmission lines 2011, and the orthographic projections of the second connection lines 2013 on the touch electrode wiring layer 10 are located between adjacent touch electrodes 101.

In the touch display panel 400 provided by the embodiment of the present application, by electrically connecting one touch electrode 101 to at least two signal transmission lines 2011, and the at least two signal transmission lines 2011 are arranged in parallel, the total resistance of the at least two signal transmission lines 2011 electrically connected to the touch electrode 101 can be reduced, thereby reducing the resistance-capacitive load on the signal transmission lines 2011 and improving the touch precision of the touch display panel 400. At the same time, the embodiment of the present application also sets a first connection line 2012 and the second connection line 2013 in the signal transmission line group 201. By electrically connecting the adjacent signal transmission lines 2011 through the first connection line 2012 and the second connection line 2013, it is able to further improve the electrical conductivity of the signal transmission line group 201.

Please refer to FIG. 7, FIG. 7 is an enlarged schematic view a region B of the touch display panel shown in FIG. 4, FIG. 5 or FIG. 6. Herein, the difference between the touch display panel shown in FIG. 7 and the touch display panel shown in FIG. 3 is that in the touch display panel shown in FIG. 7, the signal transmission line group 201 further comprises a third connection line 2014. Herein, the third connection line 2014 is arranged at the shortest distance between adjacent signal transmission lines 2011. Herein, the third connection line 2014 is arranged to overlap with the first gap h1.

It can be understood that in a signal transmission line group 201, on the path extending from the first end a1 to the second end a2 of two adjacent signal transmission lines 2011, they will extend away from the sub-pixels; The third connection line 2014 is provided where the distance between the signal transmission lines 2011 is the shortest.

In the touch display panel provided by the embodiments of the present application, by electrically connecting one touch electrode 101 to at least two signal transmission lines 2011, and the at least two signal transmission lines 2011 are arranged in parallel, and a total resistance of the signal transmission lines 2011 electrically connected to the touch electrode 101 can be reduced, thereby reducing the resistive-capacitive load on the signal transmission lines 2011 and improving the touch precision of the touch display panel. At the same time, the application embodiment also comprises two adjacent signal transmission lines 2011 in the signal transmission line group 201. The third connection line 2014 is arranged at the shortest distance between them, and the electrical conductivity of the signal transmission line group 201 can be further improved by electrically connecting the adjacent signal transmission lines through the third connection line 2014.

The above is a detailed introduction to a touch display panel and a touch display device provided by the embodiments of the present application. Specific examples are used in this article to illustrate the principles and implementations of the present application. The description of the above embodiments is only used to help understand the present application The method of application and its core idea; meanwhile, for those skilled in the art, according to the idea of this application, there will be changes in the specific implementation and the scope of application. In summary, the content of this specification should not be understood as Restrictions on this application.

What is claimed is:

1. A touch display panel, comprising:
a touch electrode wiring layer, wherein the touch electrode wiring layer comprises a plurality of touch electrodes, and the plurality of touch electrodes are arranged in an array; and
a signal transmission wiring layer, wherein the signal transmission wiring layer is arranged on one side of the touch electrode wiring layer, the signal transmission wiring layer comprises a plurality of signal transmission line groups, and the plurality of signal transmission line groups and the plurality of touch electrodes are electrically connected in one-to-one correspondence;
wherein each group of the plurality of signal transmission line groups comprises at least two of the signal transmission lines, the at least two of the signal transmission lines are arranged at intervals, and the at least two of the signal transmission lines in each group of the signal transmission line groups are electrically connected with the corresponding touch electrodes;
wherein the signal transmission line group further comprises a first connection line, the first connection line is disposed between the adjacent signal transmission lines, and the first connection line overlaps the plurality of the touch electrodes;
wherein the signal transmission line group further comprises a second connection line, the second connection line is disposed between the adjacent signal transmission lines, and an orthographic projection of the second connection line on the touch electrode wiring layer is located between the adjacent touch electrodes.

2. The touch display panel according to claim 1, wherein the signal transmission line group further comprises a third connection line, and the third connection line is arranged at a shortest distance between the adjacent signal transmission lines.

3. The touch display panel according to claim 1, wherein the touch display panel comprises a light emitting layer, and the light emitting layer is disposed on one side of the touch electrode wiring layer,
the light emitting layer comprises a plurality of first sub-pixels displaying a first color, a plurality of second sub-pixels displaying a second color, and a plurality of third sub-pixels displaying a third color;
the first sub-pixel and the second sub-pixel are arranged in a first row along a first direction, the third sub-pixel is arranged in a second row along the first direction, and the first row and the second row are spaced apart in a second direction, and the first direction is different from the second direction;
the plurality of the touch electrodes are arranged in a plurality of columns along the second direction, and each group of the plurality of signal transmission line groups is arranged along the second direction and overlaps at least one of the touch electrodes in the same column; and
the signal transmission lines in the plurality of the signal transmission line groups overlap gaps between the adjacent first sub-pixels and the second sub-pixels, and overlap gaps between the adjacent third sub-pixels.

4. The touch display panel according to claim 3, wherein there is a first gap and a second gap between the adjacent third sub-pixels in the second row, and the first gap is larger than the second gap;
there is a third gap between the adjacent first sub-pixels and the second sub-pixels in the first row, and the first gap is larger than the third gap; and
the adjacent signal transmission lines are separated by at least one of the second gaps or one of the third gaps in the same signal transmission line group.

5. The touch display panel according to claim 4, wherein, in the same signal transmission line group, a pair of the adjacent first sub-pixels and second sub-pixels or a pair of the adjacent third sub-pixels are spaced apart between the adjacent signal transmission lines.

6. The touch display panel according to claim 4, wherein, in the same signal transmission line group, the adjacent signal transmission lines are further arranged to overlap the same first gap.

7. The touch display panel according to claim 6, wherein the signal transmission line group further comprises a third connection line disposed at the shortest distance between adjacent signal transmission lines, and
the third connection line is arranged to overlap the first gap.

8. The touch display panel of claim 3, wherein a length of the third sub-pixel is greater than a length of the first sub-pixel, and/or the length of the third sub-pixel is greater than a length of the first sub-pixel The length of two sub-pixels.

* * * * *